US010858196B2

(12) United States Patent
Andersson et al.

(10) Patent No.: US 10,858,196 B2
(45) Date of Patent: Dec. 8, 2020

(54) CONVEYOR

(71) Applicant: SCHUR TECHNOLOGY A/S, Horsens (DK)

(72) Inventors: Jonas Andersson, Eksjö (SE); Niklas Grandin, Ormaryd (SE); Stefan Gustavsson, Aneby (SE)

(73) Assignee: SCHUR TECHNOLOGY A/S, Horsens (DK)

( * ) Notice: Subject to any disclaimer, the term of this patent is extended or adjusted under 35 U.S.C. 154(b) by 193 days.

(21) Appl. No.: 16/305,310

(22) PCT Filed: May 29, 2017

(86) PCT No.: PCT/EP2017/062861
§ 371 (c)(1),
(2) Date: Nov. 28, 2018

(87) PCT Pub. No.: WO2017/207473
PCT Pub. Date: Dec. 7, 2017

(65) Prior Publication Data
US 2020/0317451 A1    Oct. 8, 2020

(30) Foreign Application Priority Data

May 30, 2016    (DK) .................................. 2016 70375

(51) Int. Cl.
*B65G 23/34*    (2006.01)
*B65G 23/24*    (2006.01)
(Continued)

(52) U.S. Cl.
CPC .............. *B65G 23/24* (2013.01); *B65G 23/22* (2013.01); *B65G 23/34* (2013.01); *F16H 7/06* (2013.01); *B65G 2812/02148* (2013.01)

(58) Field of Classification Search
None
See application file for complete search history.

(56) References Cited

U.S. PATENT DOCUMENTS 1,572,818 A      2/1926  Smith
3,826,353 A  *   7/1974  Greasley ................ B65G 15/26
                                                          198/313
(Continued)

FOREIGN PATENT DOCUMENTS

CA    2435181 A1    2/2005
CN    1729132 A     2/2006
(Continued)

OTHER PUBLICATIONS

International Search Report—PCT/EP2017/062861.
(Continued)

*Primary Examiner* — Kavel Singh
(74) *Attorney, Agent, or Firm* — Schmeiser, Olsen & Watts, LLP (57) ABSTRACT

A conveyor with a belt for transporting an object between a first end and a second end of the conveyor is provided. The conveyor may have a first belt drive transmission at the first end and a second belt drive transmission at the second end. The drive transmission may be configured as freewheel-types in respective directions. The conveyor may have an intermediate transmission system arranged between the first end and the second end and having a first communication with the first belt drive transmission and having a second communication with the second belt drive transmission. The conveyor may have a drive system in communication with a drive shaft in the intermediate transmission system, and may be configured to turn the drive shaft bidirectional in a first drive direction and a second drive direction.

6 Claims, 5 Drawing Sheets

(51) Int. Cl.
*B65G 23/22* (2006.01)
*F16H 7/06* (2006.01)

(56) References Cited

U.S. PATENT DOCUMENTS

| | | | |
|---|---|---|---|
| 4,050,575 A * | 9/1977 | Rossio | B65G 23/06 |
| | | | 198/834 |
| 5,979,637 A | 11/1999 | Iwamoto | |
| 6,305,525 B1 | 10/2001 | Miller et al. | |
| 7,588,139 B1 * | 9/2009 | Campbell, III | B65G 15/105 |
| | | | 198/407 |
| 8,177,056 B2 * | 5/2012 | Muller | B65G 15/28 |
| | | | 198/834 |
| 8,186,667 B2 * | 5/2012 | Hirabayashi | B65H 29/125 |
| | | | 271/10.13 |
| 10,414,595 B2 * | 9/2019 | Levine | B65G 23/32 |
| 10,486,913 B2 * | 11/2019 | Scholz | B65G 23/30 |

| | | | |
|---|---|---|---|
| 2004/0195075 A1 | 10/2004 | Orndorff | |
| 2007/0010908 A1 | 1/2007 | Bonora | |
| 2010/0244375 A1 | 9/2010 | Hirabayashi et al. | |

FOREIGN PATENT DOCUMENTS

| | | |
|---|---|---|
| CN | 201932654 U | 8/2011 |
| DE | 19722232 A1 | 12/1998 |
| DE | 202006007747 U1 | 7/2006 |
| GB | 626520 A | 7/1949 |
| GB | H0572829 U | 7/1949 |
| GB | 1129844 A | 10/1968 |
| JP | 10572829 U | 10/1993 |

OTHER PUBLICATIONS

Written Opinion—PCT/EP2017/062861.
Danish Search Report dated Jan. 17, 2017 for Application PA 2016 70375.

* cited by examiner

CONVEYOR

CROSS-REFERENCE TO RELATED APPLICATIONS

This application claims priority to PCT Application No. PCT/EP2017/062861, having a filing date of May 29, 2017, which is based on DK Application No. PA 2016 70375, having a filing date of May 30, 2016, the entire contents both of which are hereby incorporated by reference.

FIELD OF TECHNOLOGY

The following relates to a conveyor with a belt for transporting an object between a first end and a second end of the conveyor. The conveyor may have a first belt drive transmission at the first end and a second belt drive transmission at the second end. The drive transmission may be configured as freewheel-types in respective directions. The conveyor may have an intermediate transmission system arranged between the first end and the second end and having a first communication with the first belt drive transmission and having a second communication with the second belt drive transmission. The conveyor may have a drive system in communication with a drive shaft in the intermediate transmission system, and may be configured to turn the drive shaft bidirectional in a first drive direction and a second drive direction. The conveyor may be configured with the drive shaft having an intermediate communication with the first communication through a first intermediate transmission and the second communication through a second intermediate transmission.

BACKGROUND

Conveyor belts are widely known and described. Reversible direction conveyors are also known. However, repeated use of known conveyor belts requires adjustments and tightening of mechanical parts communicating with each other. In particular reverse direction conveyors face issues with slag caused by usage. Furthermore, known art conveyors are space consuming.

A conveyor disclosed in DE 20 2006 007747 U1. D1 does not disclose that the engagement means can automatically engage or disengage the intermediate transmissions depending on the conveying direction and thereby eliminate or counteract any push force.

SUMMARY

An aspect of the embodiments of the invention is achieved by a conveyor with a belt for transporting an object between a first end and a second end of the conveyor. The conveyor may have a first belt drive transmission at the first end and a second belt drive transmission at the second end.

The drive transmission may be configured as freewheel-types in respective directions.

The conveyor may have an intermediate transmission system arranged between the first end and the second end and having a first communication with the first belt drive transmission and having a second communication with the second belt drive transmission.

The conveyor may have a drive system in communication with a drive shaft in the intermediate transmission system, and may be configured to turn the drive shaft bidirectional in a first drive direction and a second drive direction.

The conveyor may be configured with the drive shaft having an intermediate communication with the first communication through a first intermediate transmission and the second communication through a second intermediate transmission.

The disclosed conveyor is compact and low weight, which allows for installation with in industrial process equipment. The conveyer may be adapted to be rotated in a pile preparation unit. The conveyor is reversible, and has a single centre positioned drive system. The conveyor may transport heavy loads and with an equal load and equal torque in the forward and reverse directions.

The conveyor eliminates or counteracts any "push" forces on the belt.

In a feature, the first intermediate transmission is configured for engagement and force transmission at a first engagement position in the first drive direction and a second engagement position in the second drive direction and in-between having a first path of un-engagement.

In a feature, the second intermediate transmission is configured for engagement and force transmission at a first engagement position in the first drive direction and a second engagement position in the second drive direction and in-between having a second path of un-engagement.

In a feature, the intermediate communication is arranged so that for the first drive direction, the first intermediate transmission is enabled for engagement at the first engagement position whilst the second intermediate transmission is in the second path of un-engagement. For the same aspect and for the second drive direction, the second intermediate transmission is enabled for engagement at the second engagement position whilst the first intermediate transmission is in the first path of un-engagement.

Thereby is achieved that the conveyor for the first drive direction, engages the first belt drive transmission for a first pull of the belt towards the first end whilst freewheeling the second belt drive transmission. For the second drive direction it is achieved that the second belt drive transmission engages for a second pull of the belt towards the second end whilst free-wheeling the first belt drive transmission.

Such conveyor will pull towards the respective first and second end whilst releasing tension in respective opposite ends. By pull is understood that traction power or a traction force is applied from the respective first or second end of the conveyor.

This will allow the conveyor to transport heavy objects back and forth without building-up tension. A further advantage is that tensions are released during use situations of "asymmetric load" where a heavy object is transported in one direction, substantially offloaded and then reversed as a light object.

A further advantage is that the configuration results in a flat structure of the conveyor in a direction transverse to the face of the belt for engaging with the object.

In a feature the intermediate communication comprises an intermediate chain engaging with a drive cogwheel on the driveshaft, a first intermediate drive cogwheel on the first intermediate transmission and a second intermediate drive cogwheel on the second intermediate transmission.

In a feature the first and second communications comprise respective first and second communication chains engaging respective first and second belt cogwheels in the respective first and second belt drive transmissions with respective first and second communication cogwheels in the respective first and second intermediate transmissions.

In a feature the respective first and second intermediate transmissions each has a respective first and second intermediate drive cogwheel and a respective first and second communication cogwheel sharing respective common first and second intermediate shafts. Furthermore, the respective first and second intermediate transmission may be configured with engagement means or an engagement to transmit force at least from the respective first and second drive intermediate cogwheels to the respective first and second communication cogwheels.

Hereby is achieved that the intermediate transmission can apply a pull or traction force to the respective first and second ends of the conveyor. The engagement or appliance of a force then depends on the direction of rotation so that a pull or traction force is from one end of a conveyor for one direction of rotation of the drive and that a pull or traction force is from the other end of the conveyor for an opposite direction of rotation of the drive.

In a feature the respective engagement means or engagement comprise a drive coaxial projection on the intermediate drive cogwheel covering an arc and for an engagement with a coaxial projection on the communication cogwheel.

The above-mentioned aspects according to embodiments of the invention ensures that the engagement means or engagement automatically engage or disengage the intermediate transmissions depending on the conveying direction and thereby eliminate or counteract any push force.

Hereafter specific embodiments for the invention will be explained.

In a further embodiment of the invention the sum of the arc of the drive coaxial projection and the arc of the coaxial projection is less than 360-degrees.

By the arc is understood a part of a complete turn. One projection may cover say 5-20-degrees and another projection may cover say 10-30 degrees, thereby leaving the cogwheels between 310- to 345-degrees for un-engagement and without a force transmission.

In a further embodiment of the invention one or more of the intermediate communications, the first and second communications are configured with communications or chain adjustable means or chain adjustment such as position adjustable rollers or cogwheels. Thereby the communications or chains can be tightened or loosened as required. The first and second communications can be adjusted independently of each other.

In a further embodiment of the invention the intermediate transmission system is substantially flat with the drive shaft and the respective first and second intermediate shafts arranged on a line.

Thereby is provided an intermediate transmission system with all the forces essentially going in one direction only. Advantageously the linear arrangement provides a flat and space saving configuration. The belt may circulate the drive, the transmission, and the communications. The drive, the transmission, and the communications may be assessable for adjustments and maintenance on the side of the conveyor.

In a further embodiment of the invention the first and second intermediate shafts and the drive shaft are essentially arranged on a line.

Thereby is provided an intermediate transmission system with all the forces essentially going in one direction only. Advantageously the linear arrangement provides a flat and space saving configuration. The belt may circulate the drive, the transmission, and the communications. The drive, the transmission, and the communications may be assessable for adjustments and maintenance on the side of the conveyor.

In a further embodiment of the invention the conveyor has a thickness substantially defined by the diameter of the largest cogwheel in the transmission.

In this particular embodiment the arrangement of transmissions and communications may be determined by the design requirements of a particular gearing.

In summary, a conveyor having a flat shape as disclosed may be used or integrated in other machinery, units or devices. Advantageously, such conveyor may be moved or rotated in such machinery without taking up unwanted space.

The embodiment can advantageously be combined with one or more of the following five embodiments which are not according to the invention.

A first embodiment not according to the invention may be a conveyor with a belt for transporting an object between a first end and a second end of the conveyor. The conveyor may have a first belt drive transmission at the first end and a second belt drive transmission at the second end. The drive transmission may be configured as freewheel-types in respective directions.

The conveyor may have an intermediate transmission system arranged between the first end and the second end and having a first communication with the first belt drive transmission and having a second communication with the second belt drive transmission.

The conveyor may have a drive system in communication with a drive shaft in the intermediate transmission system, and may be configured to turn the drive shaft bidirectional in a first drive direction and a second drive direction.

The conveyor may be configured with the drive shaft having an intermediate communication with the first communication through a first intermediate transmission and the second communication through a second intermediate transmission.

The disclosed conveyor is compact and low weight, which allows for installation with in industrial process equipment. The conveyer may be adapted to be rotated in a pile preparation unit. The conveyor is reversible, and has a single centre positioned drive system. The conveyor may transport heavy loads and with an equal load and equal torque in the forward and reverse directions. The conveyor eliminates or counteracts any "push" forces on the belt.

In an aspect, the first intermediate transmission is configured for engagement and force transmission at a first engagement position in the first drive direction and a second engagement position in the second drive direction and in-between having a first path of un-engagement.

In an aspect, the second intermediate transmission is configured for engagement and force transmission at a first engagement position in the first drive direction and a second engagement position in the second drive direction and in-between having a second path of un-engagement.

In an aspect, the intermediate communication is arranged so that for the first drive direction, the first intermediate transmission is enabled for engagement at the first engagement position whilst the second intermediate transmission is in the second path of un-engagement. For the same aspect and for the second drive direction, the second intermediate transmission is enabled for engagement at the second engagement position whilst the first intermediate transmission is in the first path of un-engagement.

Thereby is achieved that the conveyor for the first drive direction, engages the first belt drive transmission for a first pull of the belt towards the first end whilst freewheeling the second belt drive transmission. For the second drive direction it is achieved that the second belt drive transmission engages for a second pull of the belt towards the second end whilst free-wheeling the first belt drive transmission.

Such conveyor will pull towards the respective first and second end whilst releasing tension in respective opposite ends. By pull is understood that traction power or a traction force is applied from the respective first or second end of the conveyor. This will allow the conveyor to transport heavy objects back and forth without building-up tension. A further advantage is that tensions are released during use situations of "asymmetric load" where a heavy object is transported in one direction, substantially offloaded and then reversed as a light object. A further advantage is that the configuration results in a flat structure of the conveyor in a direction transverse to the face of the belt for engaging with the object.

In an aspect the intermediate communication comprises an intermediate chain engaging with a drive cogwheel on the driveshaft, a first intermediate drive cogwheel on the first intermediate transmission and a second intermediate drive cogwheel on the second intermediate transmission. In an aspect the first and second communications comprise respective first and second communication chains engaging respective first and second belt cogwheels in the respective first and second belt drive transmissions with respective first and second communication cogwheels in the respective first and second intermediate transmissions. In an aspect the respective first and second intermediate transmissions each has a respective first and second intermediate drive cogwheel and a respective first and second communication cogwheel sharing respective common first and second intermediate shafts. Furthermore, the respective first and second intermediate transmission may be configured with engagement means or engagement to transmit force at least from the respective first and second drive intermediate cogwheels to the respective first and second communication cogwheels.

The intermediate transmission can apply a pull or traction force to the respective first and second ends of the conveyor. The engagement or appliance of a force then depends on the direction of rotation so that a pull or traction force is from one end of a conveyor for one direction of rotation of the drive and that a pull or traction force is from the other end of the conveyor for an opposite direction of rotation of the drive.

A second embodiment according to the invention may be a pile preparation unit (PPU) for preparing a pile of sheets. The pile of sheets has a first end, which first end is optionally standing on a pallet, and opposite a free second end, a front edge side and a side edge side.

The PPU comprises a rotation base configured for standing on a floor and for supporting a rotation unit, configured with an infeed side for receiving a pile of sheets in a feed direction. The pile of sheets may optionally be on a pallet. The rotation unit may have a rotation unit frame with a rotation unit frame cross section. The rotation unit may be configured with an edge side support unit, configured with an edge side support face to support an edge side of the pile of sheets when the pile of sheets is in a rotated position to lean on the edge side support face. The rotation unit may have a lift unit configured to engage a lift plate to the free second end of the pile of sheets in the pile preparation position and to lift a pile of sheets.

In an aspect of the pile preparation unit (PPU), the rotation unit frame comprises two guides shifted in the feed direction relative to each other and each fixed to the rotation base and guiding a belt driven by a rotation unit drive system in the rotation base. The belt may be a timing belt. The belt may be a chain.

It is understood that the pile of sheets does not form part of embodiments of the invention. However for clarity and understanding, the pile of sheets is an object to which the pile preparation unit is directed to. A person skilled in the art will thus appreciate modifications of the PPU according to variations in a size or shape of a pile of sheets.

Thus the PPU provides an effective and automated apparatus for preparing a pile of sheets for processing. The disclosed PPU may handle piles of sheets of a multiplicity of types of pile-shapes and -sizes as well as a multiplicity of sheet types and weights. The disclosed PPU saves time, the PPU allows for a quick setup for a new material in a pile of sheets. Piles prepared by the PPU will be more identical and PPU will provide a substantially constant throughput. The PPU may be fully integrated in an ERP system.

The rotation unit may rotate about a rotational axis, which axis may the feed direction. The rotation unit may be configured to rotate a conveyor about the feed direction. The conveyor may be configured to transport a pallet with a pile of sheets from the infeed side in the feed direction to a pile preparation position. In an aspect the belts encircle the conveyor.

A third embodiment according to the invention may be related to changing the location of a pallet from one side of a pile of sheets to the opposite side of the pile of sheets, the following aspects of embodiments of the invention is disclosed. The changing of the location of a pallet may involve the exchange of a first pallet with a second pallet. The first pallet may be a disposable pallet such as a EUR-pallet and the second pallet may be a process pallet. A process pallet may be a type of pallet that is used in a specific clean environment.

In an aspect the rotating unit comprises a first conveyor configured to rotate with the rotating structure and the lift unit comprises a second conveyor configured as a second lift plate. This allows automatic handling and to extract existing process pallet and reuse it and apply on same pile of sheets after turning the pile 180 degrees.

In an aspect the lift unit comprises a first lift plate and a second lift plate, each configured to move and position in the lift structure to engage to the respective first end and second end of the pile of sheets.

Thereby providing a plate or face which position can be changed to support or carry a pile of sheets at the bottom and/or be removed from the top to generate the portal or space or volume required.

In an aspect the pile preparation unit may be for exchanging a first pallet with a second pallet. The pallet change module may comprise a first pallet portal with movable first pallet engagement means or first pallet engagement arranged to extend to an extraction position in the rotation unit. The pallet change module may comprise a second pallet portal with movable second pallet engagement means or second pallet engagement, arranged to extend to a delivery position in the rotation unit the first and second pallet portal vertically separated.

The lift unit may be configured to move and position the lift plate for the pallet end of the pile of sheets to be positioned at the respective extraction position and delivery position.

A fourth embodiment according to the invention may be a pile preparation unit for changing a first pallet with a second pallet, the pallets for supporting a pile of sheets with a first end and second end where the pallet has a support side, supporting the pile of sheets at the first end and an opposite base side.

The pile preparation unit may comprise a rotation unit configured with an infeed opening for receiving a pallet with a pile of sheets. The rotation unit is configured with a rotating structure to rotate a lift unit about a rotational axis.

The lift unit may be configured with a lift structure fixed to the rotating structure and has a lift plate movable along the lift structure to engage with the second end of the pile of sheets and to move and position the pile of sheets transverse, relative to the rotational axis, providing a portal for changing a pallet.

The pallet preparation unit may comprise a pallet change module comprising a pallet portal with movable pallet engagement means or movable pallet engagement for engaging with a pallet, for extraction from and/or insertion into the portal formed in an upper section of the rotation unit, when the lift plate is in the lower section of the rotation unit.

By a portal is understood a space or volume created where further actions or preparations can be performed. In particular this may involve actions or preparations where the pile of sheets being is to be prepared on a free end of the pile. Such actions may be a removal or extraction of a pallet, the insertion or delivery of a pallet, or both. Actions may also be a removal of sheets from the established free end of the pile.

The pallet preparation unit may thus receive a pile of sheets and exchange one pallet with another pallet in an automated fashion. The rotation unit may comprise a unit frame with a rotation unit frame cross section. The rotation unit may be configured to rotate a conveyer about the feed direction. The conveyer may be configured to transport a pallet with a pile of sheets from the infeed side in the feed direction to a pile preparation position.

In an aspect the pallet change module comprises a first pallet portal with movable first pallet engagement means or first pallet engagement arranged to extend to an extraction position in the rotation unit.

The pallet change module may comprise a second pallet portal with movable second pallet engagement means or second pallet engagement arranged to extend to a delivery position in the rotation unit, where the first and second pallet portals are vertically separated.

The lift may be configured to move and position the lift plate for the pallet end of the pile of sheets to be positioned at the respective extraction position and delivery position.

In an aspect the pallet change module is arranged on the side of the rotation unit and to extend the pallet engagement means or pallet engagement, the first or second or both pallet engagement means or pallet engagement into the rotation unit from a transverse direction to the rotational axis. The direction of insertion may be essentially horizontal and the pallet change module may be arranged on the side of the rotation unit relative to the infeed on a front. The pallet change module may comprise guides and supports as required to achieve a horizontal movement of a pallet. Likewise the engagement means or engagement are complementary in shape to the pallets. The engagement means or engagement may be adjustable to enable a fit to pallets of different types. A person skilled in the art will appreciate a need to perform adjustments and balance or dimension the construction as required for a pallet of a specific type to be moved in the pallet portal. Counterweights may be required. Similarly actuators may be required to adjust the position and the placement of the engagement means or engagement and thus the positioning of the pallet. The drive system may be a belt drive type of system that drives the movement. In one embodiment the first and second pallet engagement means or second pallet engagement may be identical.

In an aspect the pile preparation unit may further comprise a pallet loading unit arranged on the opposite side of the pallet change module and with a pallet loading arm fixed to the rotation unit. The pallet loading arm is configured to engage with and support a second pallet during rotation of the rotating unit and to release the second pallet on the second pallet engagement means or second pallet engagement. The pallet loading unit is configured to engage with and support a second pallet during rotation of the rotating unit and to release the second pallet on the second pallet engagement means or second pallet engagement. The pallet loading unit may be configured with a pallet loading arm fixed to the rotating structure of the rotation unit and for engaging with a second pallet so that when the rotating unit rotates the pile of sheets the loading arm transports the second pallet, and turns it upside-down for delivery of the second pallet on the second pallet engagement means or second pallet engagement in the correct orientation for immediate insertion into the portal.

A fifth embodiment according to the invention may be a pile sheet remover system (PSR) for preparing a pile of sheets with a height, a free end, and a side of sheet edges for processing in a pile preparation unit (PPU).

The PSR may comprise a sheet removing unit having a support frame supporting a moving frame, configured for a linear movement in an attack direction towards the side and the free end of the pile of sheets.

The moving frame may have a side support plate with a side support face arranged to face and apply to the side of the pile of sheets.

The PSR may have a grab plate arranged with a grab face essentially perpendicular to the side support face and extending beyond the side support face in the attack direction, configured with a grab actuator for a grab movement towards the free end of the pile of sheets.

The PSR may have one or more attack knives arranged below the grab plate to face the side of the pile of sheets, and configured with one or more attack actuators for a first attack movement in the attack direction for insertion of the one or more attack knives between a pair of sheets, i.e. between two adjacent sheets It is thereby achieved that top sheets can be removed automatically. Furthermore the arrangement can be adjusted according to different characteristics of a pile of sheets. A further advantage is that the system can be arranged in a pile preparation unit, which in other aspects such are turning the pile, airing the pile or changing of a pallet or the location of the pallet.

In an aspect there is a first attack knife for a first attack movement and a second attack knife for a second attack movement. The first attack knife may be a smaller knife with a blade in the attack direction. The first knife may be a razor blade type of knife. The second attack knife may be larger than the first knife and with a sharp and point type of form in the attack direction. The knife may also be a stylus type of shape.

In an aspect one or more second attack knives are configured with one or more transverse actuators for a movement transverse to the line of attack direction and parallel to the sheet edges. The knives used for the transverse movement may be second attack knives. There may be one knife for a transverse movement from a center area to a periphery. There may be another knife for a transverse movement from the center area to a periphery on the other side. There may be two second attack knives, each being configured with individual transverse actuators.

This effectively separates sheets to be removed from the remaining sheets. A further advantage is that the transverse movement leaves the knives in a favorable position when the actual removal takes place and thus decreases the risk of destroying the sheets.

In an aspect one or more first attack knives are configured with one or more edge lift actuators for a lift movement transverse to the line-of-attack direction and perpendicular to the sheet edges. The lift movement lifts the edge of the sheets upwardly and thus makes it possible for a further insertion into the sheets. Advantageously the movement is performed swiftly to increase the separation of sheets. The lift actuators may be pneumatic actuators. The actuators may be adjustable in action length or speed.

In an aspect, one or more attack knives are configured for a second attack movement extending the first attack movement in the attack direction for further insertion of the one or more attack knives between the pair of sheets. This second movement may be provided by the same actuator used for the first movement. The second movement may also be provided by additional actuators. Thus there may be a first set of actuators and a second set of actuators.

BRIEF DESCRIPTION

Some of the embodiments will be described in detail, with references to the following Figures, wherein like designations denote like members, wherein.

DETAILED DESCRIPTION

| Item | Reference Number |
| --- | --- |
| Conveyor | 100 |
| Belt | 110 |
| Object | 120 |
| First end | 131 |
| Second end | 132 |
| Motor | 140 |
| Intermediate communication | 150 |
| First communication | 151 |
| Second communication | 152 |
| Intermediate chain | 160 |
| First communication chain | 161 |
| Second communication chain | 162 |
| First belt drive transmission | 201 |
| Second belt drive transmission | 202 |
| Belt cogwheels | 210 |
| First and second belt cogwheels | 211, 212 |
| Belt shafts | 215 |
| First and second belt shafts | 216, 217 |
| Intermediate transmission system | 220 |
| First intermediate transmission | 221 |

-continued

| Item | Reference Number |
| --- | --- |
| Second intermediate transmission | 222 |
| Intermediate shaft | 230 |
| First intermediate shaft | 231 |
| Second intermediate shaft | 232 |
| Communication cogwheels | 240 |
| First and second communication cogwheels | 241, 242 |
| Intermediate drive cogwheel | 250 |
| First and second intermediate drive cogwheels | 251, 252 |
| Engagement means or Engagement | 260 |
| Drive coaxial projection | 262 |
| Coaxial projection | 264 |
| Engagement | 300 |
| First engagement position | 301 |
| Second engagement position | 302 |
| Path of un-engagement | 310 |
| First path of un-engagement | 311 |
| Second path of un-engagement | 312 |
| Pull | 350 |
| First pull | 351 |
| Second pull | 352 |
| Drive direction | 400 |
| First drive direction | 401 |
| Second drive direction | 402 |
| Drive system | 420 |
| Drive shaft | 430 |
| Drive cogwheel | 440 |

Figure 1:
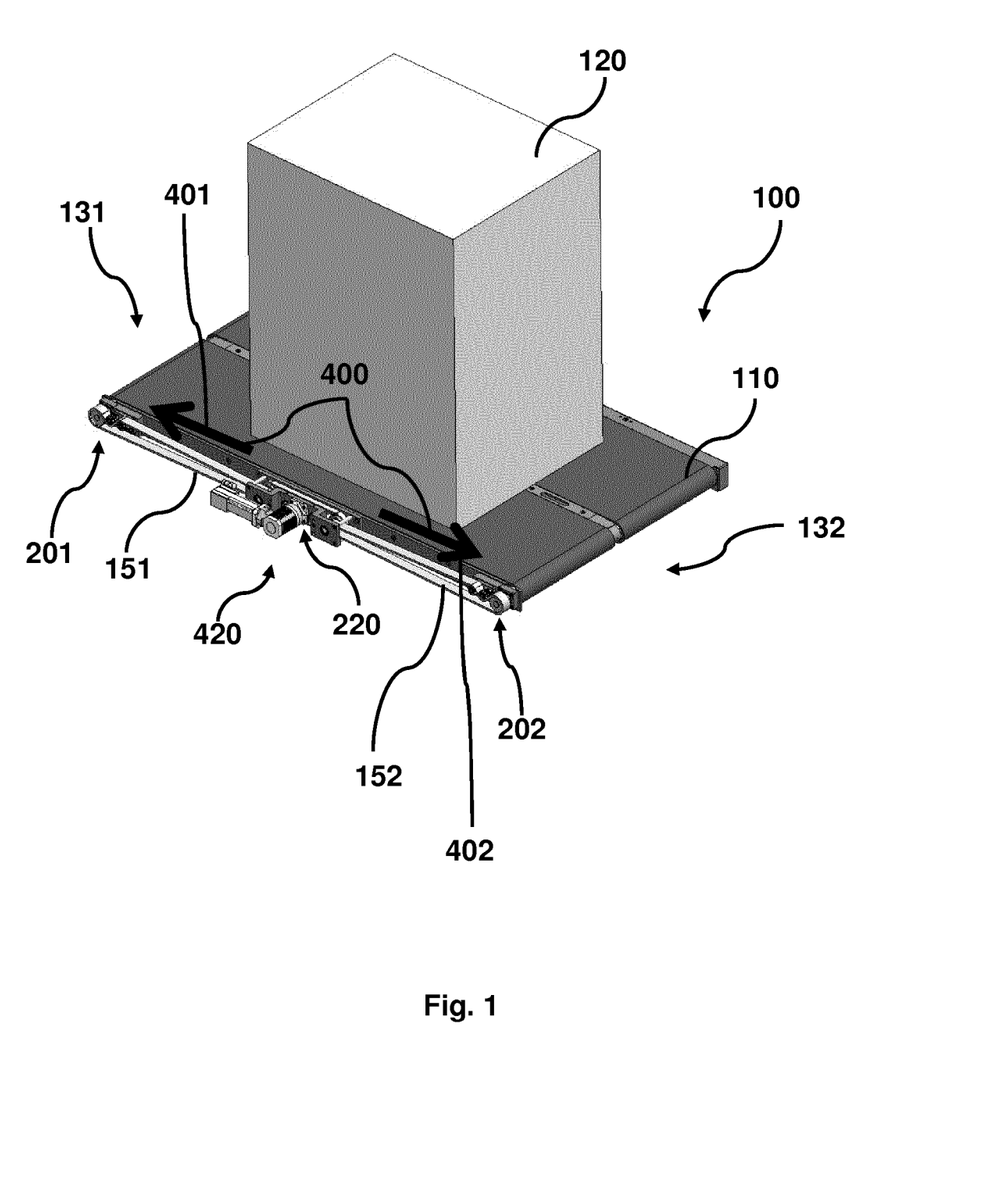
FIG. 1 illustrates a conveyor with a belt for transporting an object.

FIG. 1 illustrates a conveyor 100 with a belt 110 for transporting an object 120 between a first end 131 and a second end 132 of the conveyor 100.

In an embodiment the object 120 is a pile of sheets stacked on a pallet.

The conveyor 100 has a first belt drive transmission 201 at the first end 131 and a second belt drive transmission 202 at the second end 132.

The intermediate transmission system 220 is arranged between the first end 131 and the second end 132. The intermediate transmission system 220 has a first communication 151 with the first belt drive transmission 201 and a second communication 152 with the second belt drive transmission 202.

The conveyor 100 has a drive system 420, which communicates with the drive shaft 430 in the intermediate transmission system 220. The drive system 420 is configured to turn the drive shaft 430 bidirectional in a first drive direction 401 and a second drive direction 402.

Figure 2A:
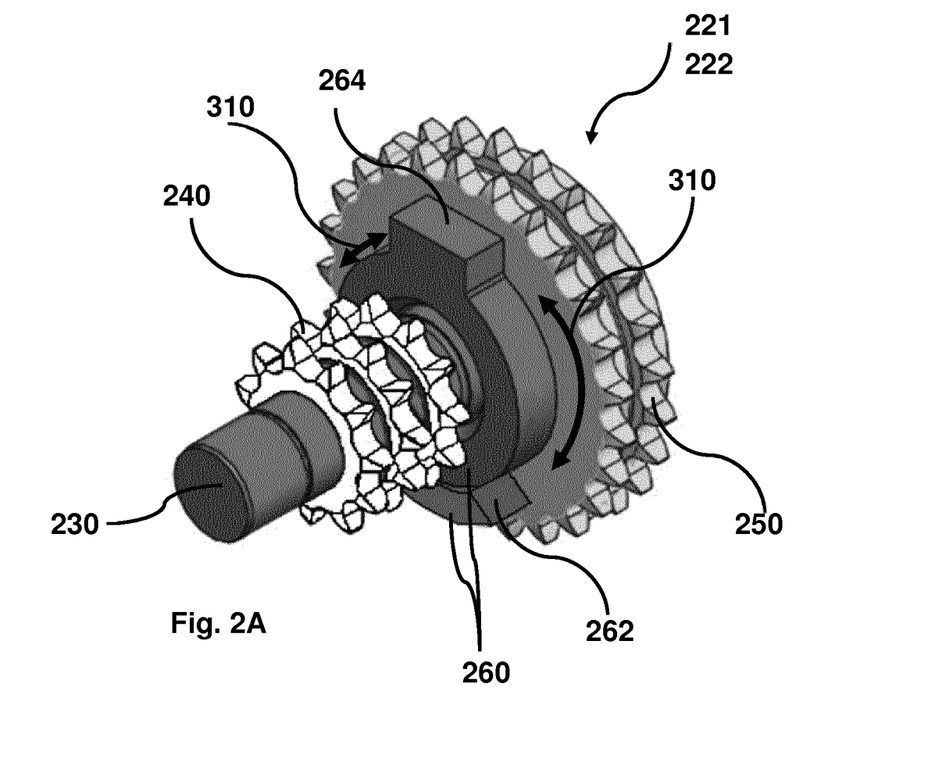
FIG. 2A illustrates an intermediate transmission system with a drive system.

FIG. 2A illustrates an embodiment of an intermediate transmission system 220, which may be used as a first and second intermediate transmission system 221, 222.

The intermediate transmission system 220 generally comprises an intermediate transmission 221, 222. The arrangement has an intermediate drive cogwheel 250 and a communication cogwheel 240 sharing a common intermediate shaft 230. The intermediate cogwheel 250 and communication cogwheel 240 are configured with engagement means or engagement 260 to transmit force at least from the drive intermediate cogwheel 250 to the communication cogwheel 240.

For reference, in the remaining figures and implementation of the conveyor (not shown), the intermediate transmission system 220 has two intermediate transmissions 221, 222. The respective first and second intermediate transmissions 221,222 each has a respective first and second intermediate drive cogwheel 251,252 and a respective first and second communication cogwheel 241,242 sharing respective common first and second intermediate shafts 231,232, and configured with engagement means or engagement 260 to transmit force at least from the respective first and second drive intermediate cogwheels 251,252 to the respective first and second communication cogwheels 241,242.

Figure 2B:
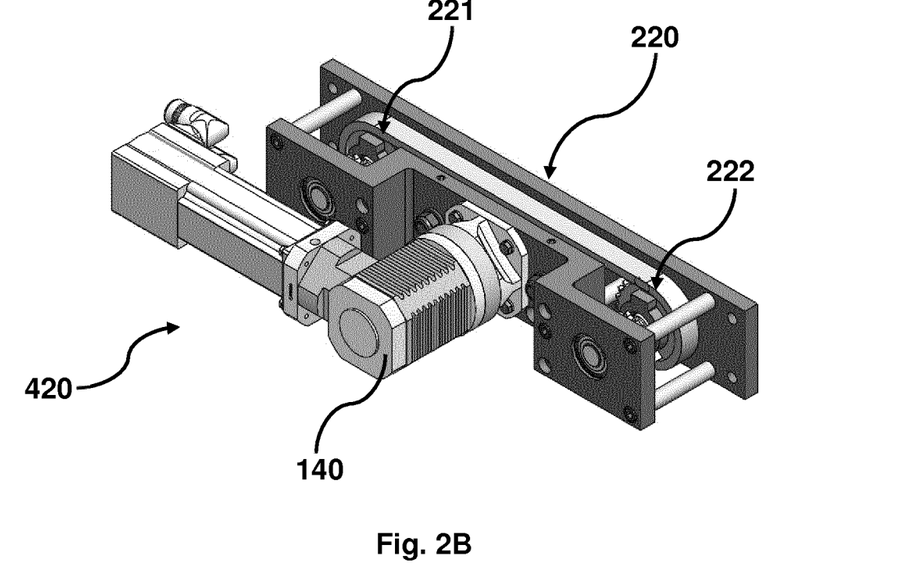
FIG. 2B illustrates the drive system with a motor driving the drive shaft in the intermediate transmission system.

FIG. 2B illustrates the drive system 420 with a motor driving the drive shaft 430 in the intermediate transmission system 220. The intermediate transmission system has a first intermediate transmission 221 and a second intermediate transmission 222.

Figure 3A:
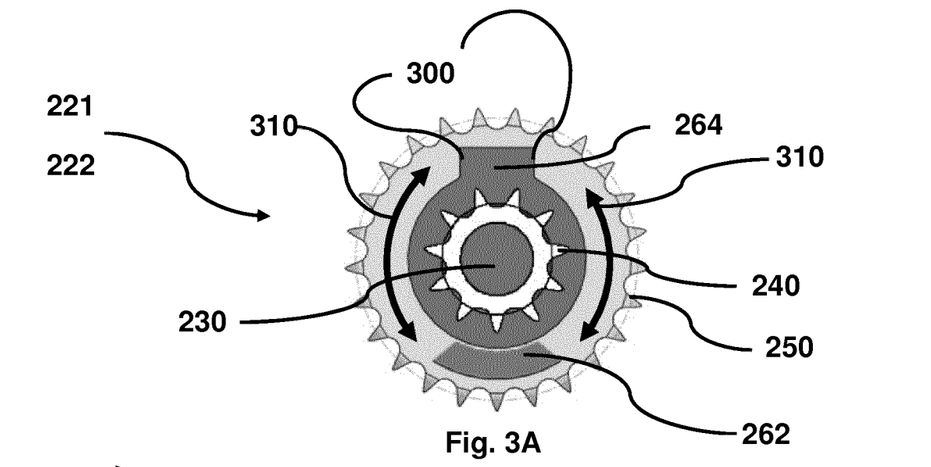
FIG. 3A illustrates details about respective first and second intermediate transmissions.
Figure 3B:
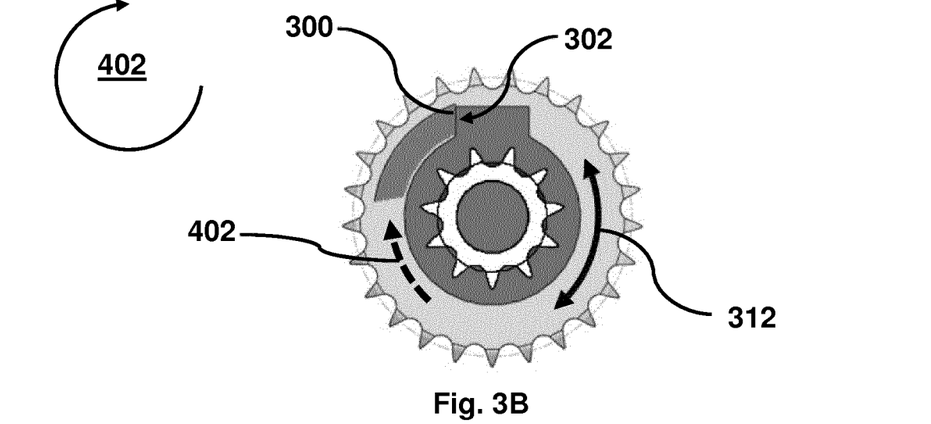
FIG. 3B illustrates details about respective first and second intermediate transmissions.
Figure 3C:
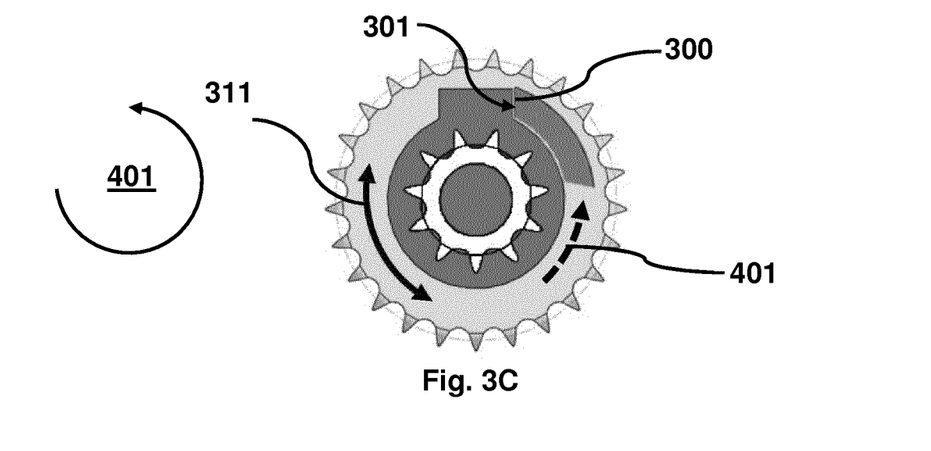
FIG. 3C illustrates details about respective first and second intermediate transmissions.

FIGS. 3A, 3B, and 3C illustrate details about respective first and second intermediate transmissions 221, 222.

With reference to FIG. 2A, FIGS. 3A, 3B, and 3C illustrate intermediate transmissions 221, 222 arrangements where each has an intermediate drive cogwheel 250 and a communication cogwheel 240 sharing a common intermediate shaft 230. The intermediate cogwheel 250 and communication cogwheel 240 are configured with engagement means or engagement 260 to transmit force at least from the drive intermediate cogwheel 250 to the communication cogwheel 240.

The engagement means or engagement 260 comprise a drive coaxial projection 262 on the intermediate drive cogwheel 250 covering an arc and for an engagement 300 with a coaxial projection on the communication cogwheel 264.

As is seen from the figures the sum of the arc of the drive coaxial projection 262 and the arc of the coaxial projection 264 is less than 360-degrees, which provides a path of un-engagement 310, where the intermediate drive cogwheel 250 and the communication cogwheel 240 can rotate relative to each other without a transfer of force.

FIG. 3B illustrates a suitable implementation of a second intermediate transmission 222 configured for engagement 300 and force transmission at a second engagement position 302 in the second drive direction 402. There is a second path of un-engagement 312.

Similarly, FIG. 3C illustrates a suitable implementation of a first intermediate transmission 221 configured for engagement 300 and force transmission at a first engagement position 301 in the first drive direction 401. There is a first path of un-engagement 311.

The first and second transmissions 221, 222 may be identical.

Figure 4A:
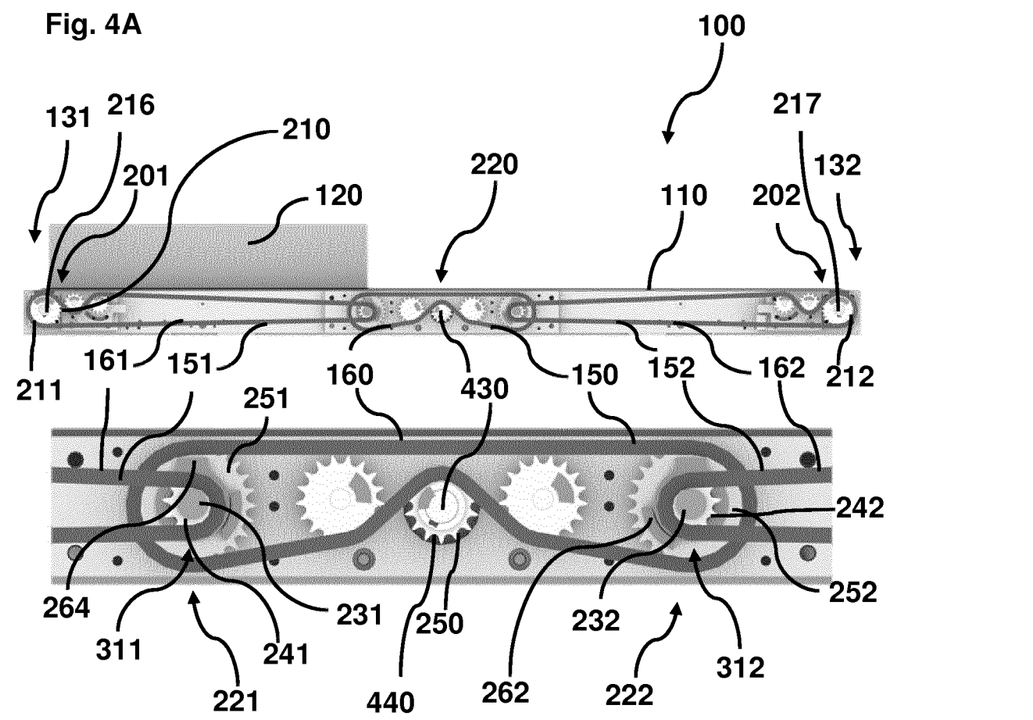
FIG. 4A illustrates a conveyor with an intermediate transmission system.

FIG. 4A illustrates a conveyor 100 with a belt 110 for transporting an object 120 between a first end 131 and a second end 132 of the conveyor. The conveyor has a first belt drive transmission 201 at the first end 131 and a second belt drive transmission 202 at the second end 132.

The intermediate transmission system 220 is arranged between the first end 131 and the second end 132. The intermediate transmission system 220 communicates with the first belt drive transmission 201 through a first communication 151.

The intermediate transmission system 220 communicates with the second belt drive transmission 202 through a second communication 152.

The intermediate transmission system 220 comprises a drive shaft 430, which has an intermediate communication 150 with the first communication 151 through a first intermediate transmission 221 and an intermediate communication 150 with the second communication 152 through a second intermediate transmission 222.

In FIG. 4A the first intermediate transmission 221 and the second intermediate transmission 222 are at first path of un-engagement 311 and at second path of un-engagement 312, respectively. Hence, no communication is sent from the intermediate transmission system 220 to the first belt drive transmission 201 or the second belt drive transmission 202. The object 120 on the conveyor is therefore stationary.

Figure 4B:
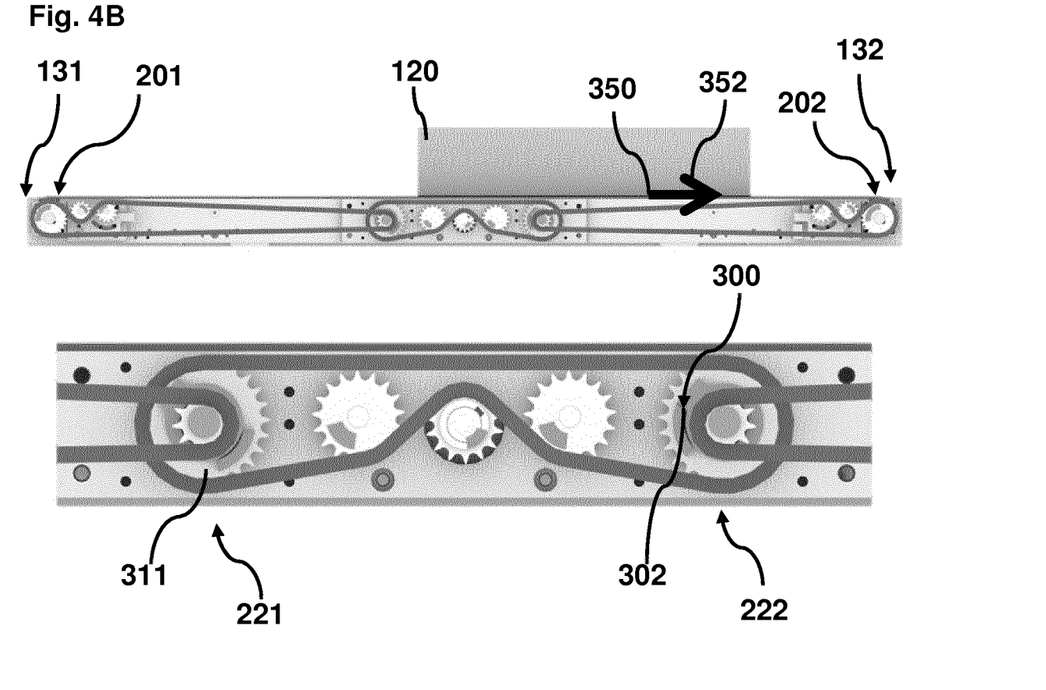
FIG. 4B illustrates a conveyor with an intermediate transmission system.

FIG. 4B illustrates the same conveyor 100 as in FIG. 4A with a belt 110 for transporting an object 120 between a first end 131 and a second end 132 of the conveyor. The conveyor has a first belt drive transmission 201 at the first end 131 and a second belt drive transmission 202 at the second end 132.

In FIG. 4B the intermediate transmission system 220 does not communicate with the first belt drive transmission 201, since the first intermediate transmission 221 is at a first path of un-engagement 311. However, the intermediate transmission system 220 does communicate with the second belt drive transmission 202 since the second intermediate transmission 222 has an engagement 300 at a second engagement position 302. This causes a second pull 352 of the belt 110 towards the second end 132 and the object 120 is moved towards the second end 132.

Figure 4C:
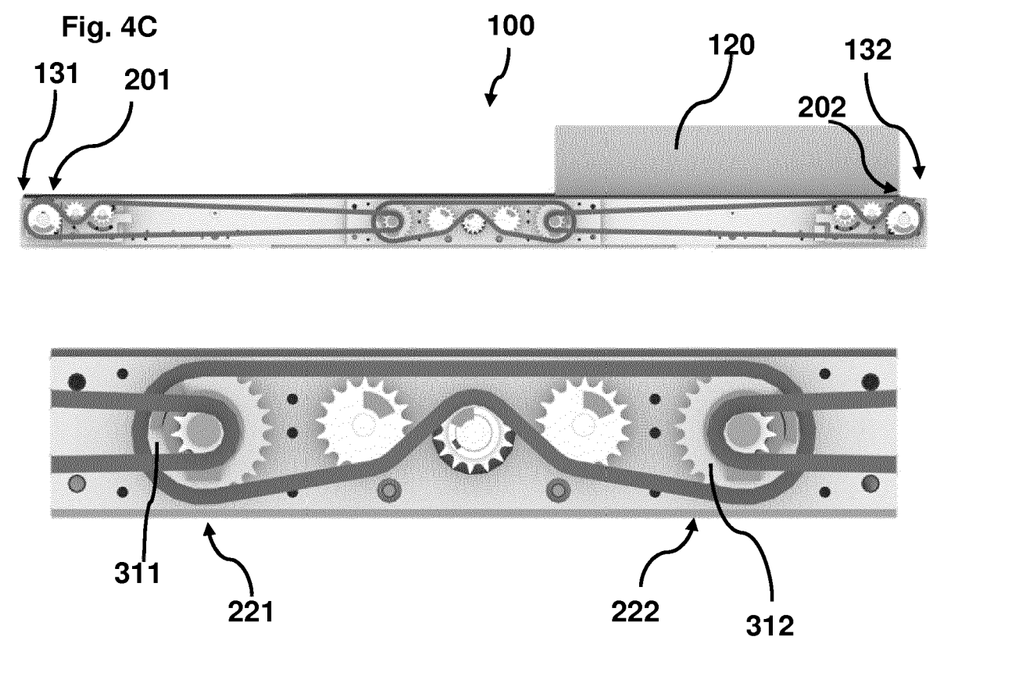
FIG. 4C illustrates a conveyor with an intermediate transmission system.

FIG. 4C illustrates the same conveyor 100 as in FIG. 4A-4B with a belt 110 for transporting an object 120 between a first end 131 and a second end 132 of the conveyor. The conveyor has a first belt drive transmission 201 at the first end 131 and a second belt drive transmission 202 at the second end 132. In FIG. 4C the object 120 is at the second end 132.

In FIG. 4C the first intermediate transmission 221 and the second intermediate transmission 222 are at first path of un-engagement 311 and at second path of un-engagement 312, respectively. Hence, no communication is sent from the intermediate transmission system 220 to the first belt drive transmission 201 or the second belt drive transmission 202. The object 120 on the conveyor is therefore stationary.

Figure 4D:
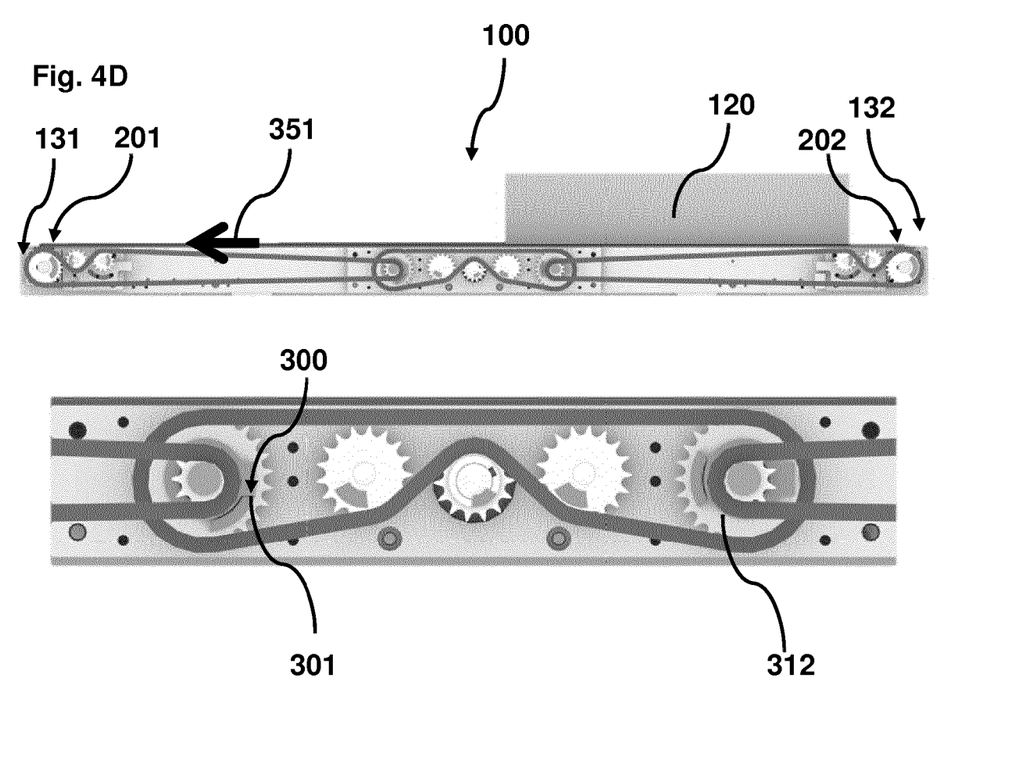
FIG. 4D illustrates a conveyor with an intermediate transmission system.

FIG. 4D illustrates the same conveyor 100 as in FIGS. 4A-4C with a belt 110 for transporting an object 120 between a first end 131 and a second end 132 of the conveyor. The conveyor has a first belt drive transmission 201 at the first end 131 and a second belt drive transmission 202 at the second end 132.

In FIG. 4D the intermediate transmission system 220 does not communicate with the second belt drive transmission 202 since the second intermediate transmission 222 is at a second path of un-engagement 312. However, the intermediate transmission system 220 does communicate with the first belt drive transmission 201 since the first intermediate transmission 221 has an engagement 300 at a first engagement position 301. This causes a first pull 351 of the belt 110 towards the first end 131 and the object 120 is moved towards the first end 131.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A conveyor with a belt for transporting an object between a first end and a second end of the conveyor, the conveyor having
    a first belt drive transmission at the first end and a second belt drive transmission at the second end;
    an intermediate transmission system arranged between the first end and the second end and having a first communication with the first belt drive transmission and having a second communication with the second belt drive transmission;

a drive system in communication with a drive shaft in the intermediate transmission system and configured to turn the drive shaft bidirectional in a first drive direction and a second drive direction;

wherein the drive shaft has an intermediate communication with the first communication through a first intermediate transmission and the second communication through a second intermediate transmission;

wherein the first intermediate transmission is configured for engagement and force transmission at a first engagement position in the first drive direction and a second engagement position in the second drive direction and in-between having a first path of un-engagement;

the second intermediate transmission is configured for engagement and force transmission at a first engagement position in the first drive direction and a second engagement position in the second drive direction and in-between having a second path of un-engagement;

the intermediate communication is arranged so that for the first drive direction: the first intermediate transmission is enabled for engagement at the first engagement position whilst the second intermediate transmission is in the second path of un-engagement; and for the second drive direction; the second intermediate transmission is enabled for engagement at the second engagement position whilst the first intermediate transmission is in the first path of un-engagement;

wherein the intermediate communication comprises an intermediate chain engaging with a drive cogwheel on the driveshaft, a first intermediate drive cogwheel on the first intermediate transmission and a second intermediate drive cogwheel on the second intermediate transmission, that the first and second communications comprise respective first and second communication chains engaging respective first and second belt cogwheels in the respective first and second belt drive transmissions with respective first and second communication cogwheels in the respective first and second intermediate transmissions, that the respective first and second intermediate transmissions each has a respective first and second intermediate drive cogwheel and a respective first and second communication cogwheel sharing respective common first and second intermediate shafts, the respective first and second intermediate transmission being configured with engagement to transmit force at least from the respective first and second drive intermediate cogwheels to the respective first and second communication cogwheels and that the respective engagement comprises a drive coaxial projection on the intermediate drive cogwheel covering an arc and for an engagement with a coaxial projection on the communication cogwheel.

2. The conveyor according to claim 1, wherein the sum of the arc of the drive coaxial projection and the arc of the coaxial projection is less than 360-degrees.

3. The conveyor according to claim 1, wherein one or more of the intermediate communications, the first and second communications are configured with communications or a chain adjustment.

4. The conveyor according to claim 1, wherein the intermediate transmission system is substantially flat with the drive shaft and the respective first and second intermediate shafts are arranged on a line.

5. The conveyor according to claim 1, wherein the first and second belt shafts, the first and second intermediate shafts and the drive shaft are arranged on a line.

6. The conveyor according to claim 1, wherein said conveyor having a thickness substantially defined by the diameter of the largest belt cogwheel.

\* \* \* \* \*